United States Patent
Renk et al.

(10) Patent No.: US 7,350,435 B2
(45) Date of Patent: Apr. 1, 2008

(54) MOTOR, ESPECIALLY A GEAR MOTOR OR A SELECTOR MOTOR OF A TRANSMISSION ACTUATING SYSTEM, AND METHOD FOR DETECTING THE MOVING DIRECTION OF A MOTOR

(75) Inventors: Hans-Juergen Renk, Lichtenau (DE); Klaus Henneberger, Buhl (DE); Martin Zimmermann, Sasbach (DE)

(73) Assignee: LuK Lamellen und Kupplungsbau Betelligungs KG, Buehl (DE)

( * ) Notice: Subject to any disclaimer, the term of this patent is extended or adjusted under 35 U.S.C. 154(b) by 459 days.

(21) Appl. No.: 10/711,828

(22) Filed: Oct. 7, 2004

(65) Prior Publication Data

US 2005/0122093 A1    Jun. 9, 2005

Related U.S. Application Data

(63) Continuation of application No. PCT/DE03/01190, filed on Apr. 10, 2003.

(30) Foreign Application Priority Data

Apr. 10, 2002   (DE) ................. 102 15 715
Apr. 30, 2002   (DE) ................. 102 19 255
Nov. 12, 2002   (DE) ................. 102 52 409

(51) Int. Cl.
*B60K 17/04*   (2006.01)
(52) U.S. Cl. ............... 74/473.12; 74/365; 74/325; 74/473.1; 180/337; 361/23; 323/267
(58) Field of Classification Search ............ 361/23; 318/254; 74/473.12, 365, 325; 180/337; 323/267
See application file for complete search history.

(56) References Cited

U.S. PATENT DOCUMENTS

| | | | | |
|---|---|---|---|---|
| 4,275,618 A | * | 6/1981 | Bale | 477/99 |
| 4,821,590 A | * | 4/1989 | Tury et al. | 74/335 |
| 4,911,031 A | * | 3/1990 | Yoshimura et al. | 74/335 |
| 4,953,053 A | * | 8/1990 | Pratt | 361/31 |
| 4,965,847 A | * | 10/1990 | Jurkowski et al. | 388/814 |
| 5,027,049 A | * | 6/1991 | Pratt et al. | 318/807 |
| 5,296,791 A | * | 3/1994 | Hipp | 318/563 |
| 5,315,218 A | * | 5/1994 | Fortune et al. | 318/54 |
| 5,703,459 A | * | 12/1997 | Yasohara et al. | 318/808 |
| 6,196,078 B1 | * | 3/2001 | DeJonge et al. | 74/473.12 |
| 6,205,874 B1 | * | 3/2001 | Kupper et al. | 74/335 |
| 6,307,337 B1 | * | 10/2001 | Nelson | 318/254 |
| 6,339,301 B1 | * | 1/2002 | Wallingford | 318/52 |
| 6,695,747 B2 | * | 2/2004 | Zimmermann et al. | 477/123 |
| 6,865,467 B2 | * | 3/2005 | Berger et al. | 701/51 |
| 7,038,667 B1 | * | 5/2006 | Vassallo et al. | 354/184 |
| 2002/0156562 A1 | * | 10/2002 | Berger et al. | 701/55 |

FOREIGN PATENT DOCUMENTS

| | | |
|---|---|---|
| EP | 0899847 | 3/1999 |
| JP | 4069087 | 3/1992 |
| JP | 6339293 | 12/1994 |

* cited by examiner

*Primary Examiner*—Rita Leykin
(74) *Attorney, Agent, or Firm*—Simpson & Simpson, PLLC

(57) ABSTRACT

The invention relates to a method for determining the moving direction of a motor, especially an electric motor of a transmission actuating system for gear selection and/or shifting, whereby at least one signal of the motor is detected. The inventive method is characterized in that the moving direction of the motor is validated by means of the detected signal, on the basis of the feed direction. The invention also relates to a motor, especially a gear motor or a selector motor of a transmission actuating system, especially for carrying out the method, whereby at least one device is provided for validating the moving direction of the motor.

10 Claims, No Drawings

MOTOR, ESPECIALLY A GEAR MOTOR OR A SELECTOR MOTOR OF A TRANSMISSION ACTUATING SYSTEM, AND METHOD FOR DETECTING THE MOVING DIRECTION OF A MOTOR

CROSS REFERENCE TO RELATED APPLICATIONS

This application is filed under 35 U.S.C §120 and §365 (c) as a continuation of International Patent Application PCT/DE03/01190, filed Apr. 10, 2003, which application is incorporated herein by reference. This application also claims priority of German Patent Application Nos. 102 15 715.4 filed Apr. 10, 2002, 102 19 255.3 filed Apr. 30, 2002, and 102 52 409.2 filed Nov. 12, 2002 which applications are incorporated herein by reference.

BACKGROUND OF THE INVENTION

The present invention relates to a motor, especially a shift or select motor of a transmission actuating mechanism and a method for determining the direction of movement of a motor, especially an electric motor of a transmission actuating mechanism for the select and/or shift operations in which at least one signal of the motor is detected.

For the determination of the rotary direction or the direction of movement in a motor, such as a shift and/or select motor of a transmission actuating mechanism of an automatic transmission, a frequency signal and a directional signal is detected for each.

The detected signal may give information about a short circuit on the ground cable, a short circuit on the phase or a cable break as well as the high level (approximately 8 volts) and the low level (approximately 4 volts).

However, a plausible, but incorrect signal that is due, for example, to a changed transfer resistance on a plug or the like, cannot be detected by the known method.

OBJECTS OF THE INVENTION

The object of the present invention is to propose a motor, especially a shift or select motor of a transmission actuating mechanism, and a method for determining the direction of movement of a motor, especially an electric motor of a transmission actuating mechanism for the select and/or shift operations, so that a recognition of an incorrect direction of movement of the motor is prevented.

SUMMARY OF THE INVENTION

This objective is achieved using a method for determining the direction of movement of a motor, especially an electric motor of a transmission actuating mechanism for the select and/or shift operations, in which at least one signal of the motor is detected, the direction of movement of the motor being validated on the basis of the flow direction via at least one detected signal.

In this manner, a review of the direction of movement of, for example, electric motors or the like, may be realized on the basis of the flow direction. Thus, the fault recognition can be substantially expanded and accelerated.

Within the context of an advantageous embodiment of the present invention, it may be provided to expand the fault recognition in such a manner that, especially in a motor that is de-energized and stationary, a validation is preferably carried out in which the starting current is compared to the direction signal of a sensor of the electric motor. In this context, it is possible to check whether the received directional signal after a certain time with corresponding rotary movement of the electric motor for a predetermined time does not correspond to the predetermined flow direction. If this case is present, for example, an output stage, preferably of the transmission actuating mechanism, can be switched off as a result of the fault detection. Possible causes of faults may be, for example:

a pulse-width-modulation signal (PWM signal) may have its wiring mixed up;
the magnets or the pole pot of the motor could have been mixed up in manufacture;
the sensor used is defective, which is generated from the direction signal; and
the transfer resistances are too high, for example, for the plug contacts used.

Furthermore, according to a next further development, it may be provided that in the method of the present invention other applications besides the ones already mentioned, such as with a frequency and a direction signal, are possible, e.g., in motors having multiple sensors, especially Hall sensors or the like, that supply various frequency signals.

In these applications, according to a further development of the present invention, the direction may be determined from the sequence of the frequency levels. The use of this variant of the inventive method is especially advantageous in brushless motors.

Within the context of another embodiment of the invention, it is possible to carry out a validation of the starting current with the frequency signals of the Hall sensors starting from a motor that is de-energized and stationary. In so doing, it is possible to check whether the sensor edge received as the next one does not correspond to the predetermined flow direction. Should this be the case, an output stage or the like, for example, can also be switched off as a result of the fault recognition.

The cause for a detected fault may also be, in addition to a distorted signal or frequency level, a defective sensor. Due to the very rapid fault recognition in the method of the present invention, it is possible that the otherwise additional short circuit monitoring may be omitted in an advantageous way.

It is also possible that the aforementioned measures and other ones for validating the movement direction of the motor are combined with each other as desired to further improve the method of the present invention.

For example, a variant of the invention may also be provided that, similar to a PT1-element or the like, the flow is compared accordingly to the changed position.

The object of the present invention may also be achieved via a motor, especially a shift or select motor of a transmission actuating mechanism, especially for carrying out the proposed method, in which at least one device is provided to validate the movement direction of the motor.

The motor of the present invention may preferably have at least one Hall sensor or the like as the sensor whose signals may be evaluated by the device in order to enable a fault recognition in the movement direction of the motor.

Additional advantages and advantageous embodiments arise from the dependent claims.

The patent claims submitted with the application are proposed formulations without prejudice to the achievement of further patent protection. The applicant reserves the right to submit claims for further combinations of the features previously only disclosed in the description and/or the drawings.

References used in the dependent claims refer to the further development of the subject matter of the principal claim via the features of the particular dependent claim; they are not to be understood as a renunciation of achieving independent protection for the combination of features for the dependent claims that are referenced.

Since the subject matter of the dependent claims may constitute separate and independent inventions in relation to the state of the art on the priority date, the applicant reserves the right to make them the subject matter of independent claims or division declarations. Furthermore, they may also contain independent inventions that have a design that is independent of the subject matter of the preceding dependent claims.

The embodiments are not to be understood as a restriction of the invention. Rather, numerous amendments and modifications are possible within the context of the current disclosure, especially those variants, elements and combinations and/or materials that one skilled in the art may learn, for example, by combining individual ones together with those in the general description and embodiments in addition to features and/or elements or methodological steps described in the claims and contained in the drawings with the aim of achieving the objective and leading to a new subject matter or new methodological steps or sequences of steps via combinable features, even as far as production, testing and work procedures are concerned.

What is claimed is:

1. A method for determining the direction of movement of an electric motor of a transmission actuating mechanism for the select and/or shift operation, in which at least one signal of the motor is detected, wherein the direction of movement of the motor is validated on the basis of current flow direction by at least one detected signal, and wherein in a motor that is de-energized and stationary, the starting current is compared to the directional signal of a sensor.

2. The method as described in claim 1, wherein, if the detected directional signal for a determined time interval does not agree with the aforementioned flow direction of the electric motor, a fault regarding the direction of movement is recognized.

3. The method as described in claim 2, wherein in the presence of a fault at least one output stage of the transmission actuating mechanism is switched off.

4. The method as described in claim 1, wherein, in a brushless electric motor, the direction of movement is determined from the sequence of the frequency level for the detection of different frequency signals by multiple sensors.

5. The method as described in claim 4, wherein the starting current is validated via the frequency signals of the sensors starting from an electric motor that is de-energized and stationary.

6. The method as described in claim 5, wherein a check is made of whether the signal edge received as the next one does not correspond to the predetermined flow direction.

7. The method as described in claim 6, wherein, when the signal edge does not correspond, a fault with respect to direction of movement is recognized.

8. The method as described in claim 7, wherein, when a fault is recognized, at least one output stage of the transmission actuating mechanism is switched off.

9. The method as described in claim 1, wherein at least one Hall sensor is used as the sensor.

10. A shift motor of a transmission actuator comprising at least one means for validating the direction of movement of the motor, wherein said means measures a detected signal current flow, and wherein said means further comprises at least one Hall sensor.

* * * * *